United States Patent
Xu et al.

(10) Patent No.: US 6,806,980 B2
(45) Date of Patent: Oct. 19, 2004

(54) ADAPTIVE ILLUMINATION CORRECTION OF SCANNED IMAGES

(75) Inventors: Beilei Xu, Penfield, NY (US); Robert P. Loce, Webster, NY (US)

(73) Assignee: Xerox Corporation, Stamford, CT (US)

(*) Notice: Subject to any disclaimer, the term of this patent is extended or adjusted under 35 U.S.C. 154(b) by 719 days.

(21) Appl. No.: 09/750,568

(22) Filed: Dec. 28, 2000

(65) Prior Publication Data

US 2002/0085248 A1 Jul. 4, 2002

(51) Int. Cl.[7] .............. H04N 1/04; H04N 1/38; H04N 1/40; G06K 9/38
(52) U.S. Cl. .............. 358/474; 358/493; 358/475; 358/463; 358/461; 382/270
(58) Field of Search ............... 358/493, 474, 358/475, 463, 461; 382/270

(56) References Cited

U.S. PATENT DOCUMENTS

| | | | |
|---|---|---|---|
| 4,980,720 A | 12/1990 | Siegel | |
| 5,583,659 A | * 12/1996 | Lee et al. | 358/3.13 |
| 5,659,404 A | 8/1997 | Matsuda | |
| 5,689,348 A | 11/1997 | Takahashi et al. | |
| 5,940,544 A | * 8/1999 | Nako | 382/293 |
| 5,969,829 A | 10/1999 | Matsuda et al. | |
| 6,041,146 A | 3/2000 | Kamon et al. | |

* cited by examiner

*Primary Examiner*—Edward Coles
*Assistant Examiner*—Houshang Safaipour
(74) *Attorney, Agent, or Firm*—Fay, Sharpe, Fagan, Minnich & McKee, LLP

(57) ABSTRACT

A method of correcting illumination variation in a scanned image of a non-planar original object, such as an open book, includes scanning at least a portion of the book in order to produce scanned image data. Illumination variation data is extracted from the scanned image data and used to derive a plurality of illumination compensation values. The scanned image data is then compensated or scaled in accordance with the illumination compensation values. Illumination data is acquired through a sampling window having a long and thin geometry. From the data acquired via the sampling window, foreground and background illumination distributions are defined. From the foreground and background illuminations, high and low threshold values are determined in order to calculate a set of reference or compensation values. A tone reproduction curve is generated in order to map the scanned data, thus normalizing the illumination variation. Alternately, an illumination gain factor is employed in the compensation.

30 Claims, 8 Drawing Sheets

ADAPTIVE ILLUMINATION CORRECTION
OF SCANNED IMAGES

BACKGROUND OF THE INVENTION

The present invention generally relates to the art of digital imaging. It finds particular application in conjunction with correcting illumination variation in a scanned image of a bound book, and will be described with particular reference thereto. It is to be appreciated, however, that the invention will also find application in conjunction with correction of illumination variation in other bound material and three-dimensional objects on a variety of image acquisition and output devices, such as scanners, xerographic copiers, and printers.

Conventionally, when a book or other bound, multi-page original is scanned on a scanner or xerographic apparatus, the resulting digital image is very dark in the region adjacent the binding. Such an effect is illustrated in FIG. 1. This effect occurs due to the distance and shape of the gap, as well as properties of the illuminator and imaging optics. The illumination problem varies spatially, ranging from nominal and within specification at some distance from the gap or binding, to progressively darker and unacceptable, i.e. outside of specification, for pixels closer to the center of the gap. The spatially varying illumination degrades the appearance of the scanned image, often making it unreadable.

The above illumination variation problem has been addressed in a variety of ways in the prior art. A common "brute force" approach is to press the page or pages to be copied against the surface of the platen. However, portions of the pages adjacent the binding region still remain a short distance above the platen surface.

Another solution to the above problem is to modify the platen to have a sloping edge portion whereby the bound part of the book is placed in a corner position such that the entire surface of the page being copied is in close contact with the platen surface. This system suffers from a limited magnification range because of restriction on scan component movement near the sloping corner edge. In addition, operability and production are limited by the inability to perform a "split scan," where both pages of a book are scanned without repositioning.

Another solution to the illumination variation problem involves a correction in which the height variations of the document are detected and used in a correction algorithm. This type of height-dependent correction may be employed by face-up image reading devices, where a document is scanned in a face up position, such as that embodied in U.S. Pat. No. 5,659,404 to Matsuda. Incorporating height variation data into the illumination correction algorithm adds unwanted processing complexity and time and requires additional component costs.

The present invention contemplates a new and improved adaptive illumination correction method which overcomes the above-referenced problems and others.

SUMMARY OF THE INVENTION

In accordance with one aspect of the present invention, a method of correcting illumination variation in a scanned image of a non-planar original object includes scanning at least a portion of the non-planar original object in order to produce scanned image data. Illumination variation data is extracted from the scanned image data and a plurality of illumination compensation values are derived from the acquired illumination variation data. The scanned image data is then altered in accordance with the illumination compensation values.

In accordance with a more limited aspect of the present invention, acquiring illumination variation data includes measuring illumination values at a plurality of pixel locations within a sampling window.

In accordance with a more limited aspect of the present invention, deriving a plurality of illumination compensation values includes defining a background illumination distribution and a foreground illumination distribution.

In accordance with a more limited aspect of the present invention, deriving a plurality of illumination compensation values includes determining a background low threshold value $B_L$ and a background high threshold value $B_H$. In addition, a foreground low threshold value $F_L$ and a foreground high threshold value $F_H$ are determined.

In accordance with a more limited aspect of the present invention, deriving a plurality of illumination compensation values includes calculating a spatially dependent illumination gain factor $g(x)$ from the measured illumination values.

In accordance with a more limited aspect of the present invention, calculating the spatially dependent illumination gain factor $g(x)$ includes averaging no more than a rank-ordered upper twenty percent of pixel illumination values within each sampling window.

In accordance with another aspect of the present invention, a digital imaging method for imaging an open book having a book binding includes scanning the open book to produce scanned image data, where the scanned image data contains illumination variations adjacent the book binding. Illumination data is extracted from the scanned image and the illumination variations across the scanned image are normalized. The normalized image is then outputted on a physical media.

In accordance with a more limited aspect of the present invention, the normalizing step includes defining a background and a foreground illumination distribution from the obtained light levels. From each background illumination distribution, a background low threshold value $B_L$ and a background high threshold value $B_H$ are determined. From each foreground illumination distribution, a foreground low threshold value $F_L$ and a foreground high threshold value $F_H$ are determined.

In accordance with a more limited aspect of the present invention, the normalizing step further includes calculating reference values for $B_L$, $B_H$, $F_L$, and $F_H$ and generating a tone reproduction curve (TRC) corresponding to the calculated reference values of $B_L$, $B_H$, $F_L$, and $F_H$.

In accordance with another aspect of the present invention, a xerographic apparatus for reproducing an image representation of a scanned open book includes a planar imaging platen and means for scanning the open book placed on the platen to produce scanned image data, where the scanned image data contains illumination variations adjacent the book binding. The apparatus further includes means for extracting illumination data from the scanned image data and a processor for calculating a plurality of illumination compensation parameters from the extracted illumination data. An image processor compensates the scanned image data for illumination variations and an illuminator transfers an image charge pattern to a photoreceptor. At least one developing station develops the charge pattern and at least one fuser station fixes a developed image onto a physical media.

In accordance with a more limited aspect of the present invention, the processor for calculating a plurality of illumination compensation parameters includes means for defining a background illumination distribution and a foreground illumination distribution and means for determining high and low threshold values for the background and foreground illumination distributions.

In accordance with a more limited aspect of the present invention, the image processor includes means for generating a tone reproduction curve (TRC) corresponding to the determined high and low threshold values for the background and foreground illumination distributions in sampling positions not adjacent the book binding. The image processor further includes means for mapping the scanned image data in accordance with the generated TRC.

One advantage of the present invention resides in an illumination correction without external height sensing.

Another advantage of the present invention resides in an illumination correction without use of calibration feature detection.

Another advantage of the present invention resides in improved scanning of a bound object without illumination variation adjacent the binding.

Still other benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
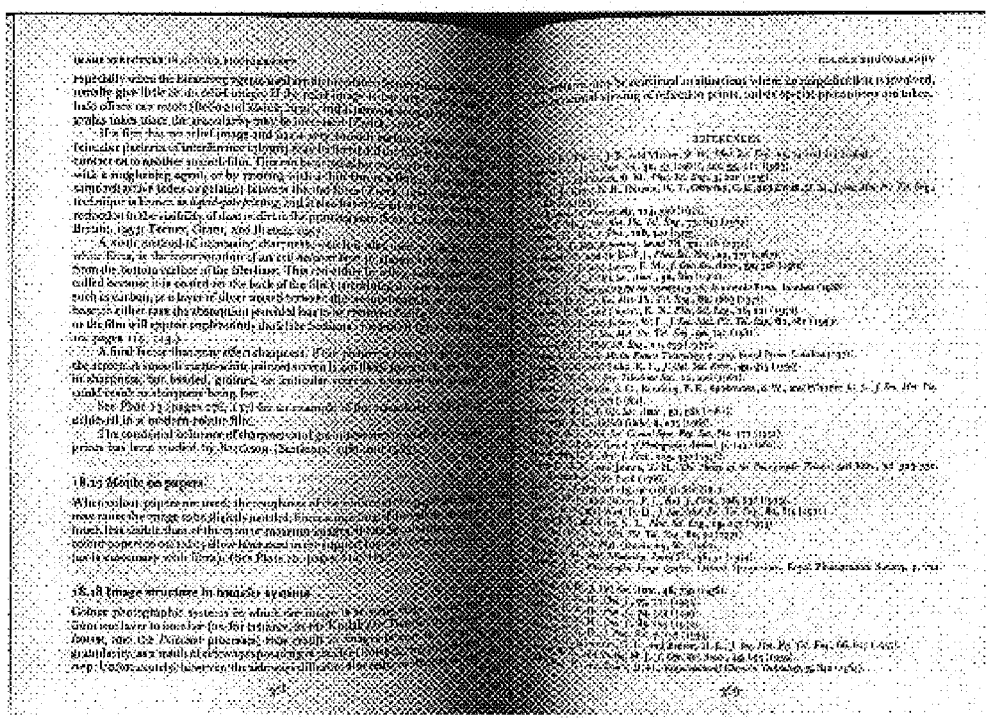
FIG. 1 is a diagrammatic illustration of a scanned image of an open book containing illumination variations adjacent the binding.
Figure 2:
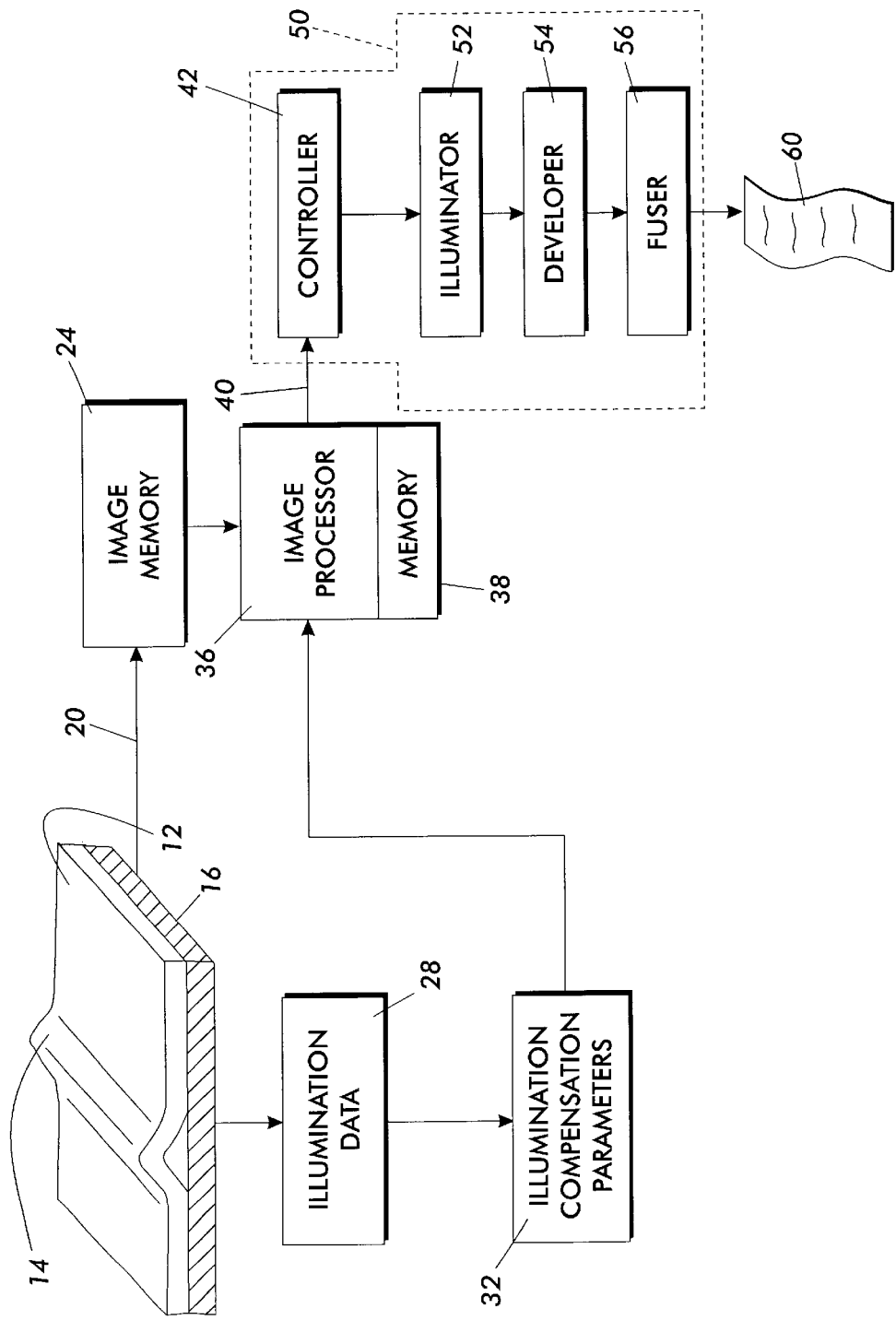
FIG. 2 is a functional block diagram of an imaging apparatus suitable to practice an embodiment of the present invention.

With reference to FIG. 2, an imaging apparatus is illustrated which compensates for illumination variations caused by height non-uniformities in the original object 12 to be scanned. More particularly, an object 12, such as an open book or other bound material, having a binding 14, is placed in a face down position on a flat scanning platen 16, as shown in FIG. 2. The original object 12 is scanned in a conventional manner, producing electrical scanned image data 20, which is stored in an image data memory 24. While the present invention is being described in terms of an open-book scan, it is to be appreciated that it is applicable to scans of other three-dimensional objects having height and illumination variations.

Illumination data is extracted from the scanned image and stored in an illumination data memory 28. As is explained more fully below, the illumination data is used to calculate a series of illumination compensation parameters 32. In a preferred embodiment, the illumination compensation parameters are calculated based on illumination data from the entire scanned image. Alternatively, the illumination compensation parameters are calculated based on illumination data from a partial scan of the original, such as a single line at a time. An image processor 36, containing a memory 38, receives the calculated illumination compensation parameters 32 and applies them to the scanned image data 20 from the image memory. The illumination compensation is provided on a pixel-by-pixel basis, rendering a compensated digital image representation 40. The compensated digital image representation 40 is output to one of a plurality of image output devices, such as a xerographic printer 50. In this embodiment, the compensated digital image representation 40 is transferred to an image processing controller 42. The controller 42 communicates the compensated image data to the remainder of the printing machine, including an illuminator 52 which transfers a physical image onto a photo-sensitive surface, at least one developer station 54, and a fuser station 56 producing an illumination-corrected hard copy 60 of the scanned image. Alternatively, the compensated digital image representation is output to a computer or network.

More particularly, in the practice of conventional xerography, it is the general procedure to form electrostatic latent images on a xerographic surface by first uniformly charging a charge retentive surface, such as a photoreceptor. The charged area is selectively dissipated in accordance with a pattern of activating radiation corresponding to original images. The selective dissipation of the charge leaves a latent charge pattern on the imaging surface corresponding to the areas not exposed by radiation.

The charge pattern is made visible by developing it with toner by passing the photoreceptor past a single developer housing 54. The toner is generally a colored powder, which adheres to the charge pattern by electrostatic attraction. The developed image is then fixed to the imaging surface or is transferred to a receiving substrate such as plain paper or other physical media to which it is fixed by suitable fusing 56 techniques.

Figure 3:
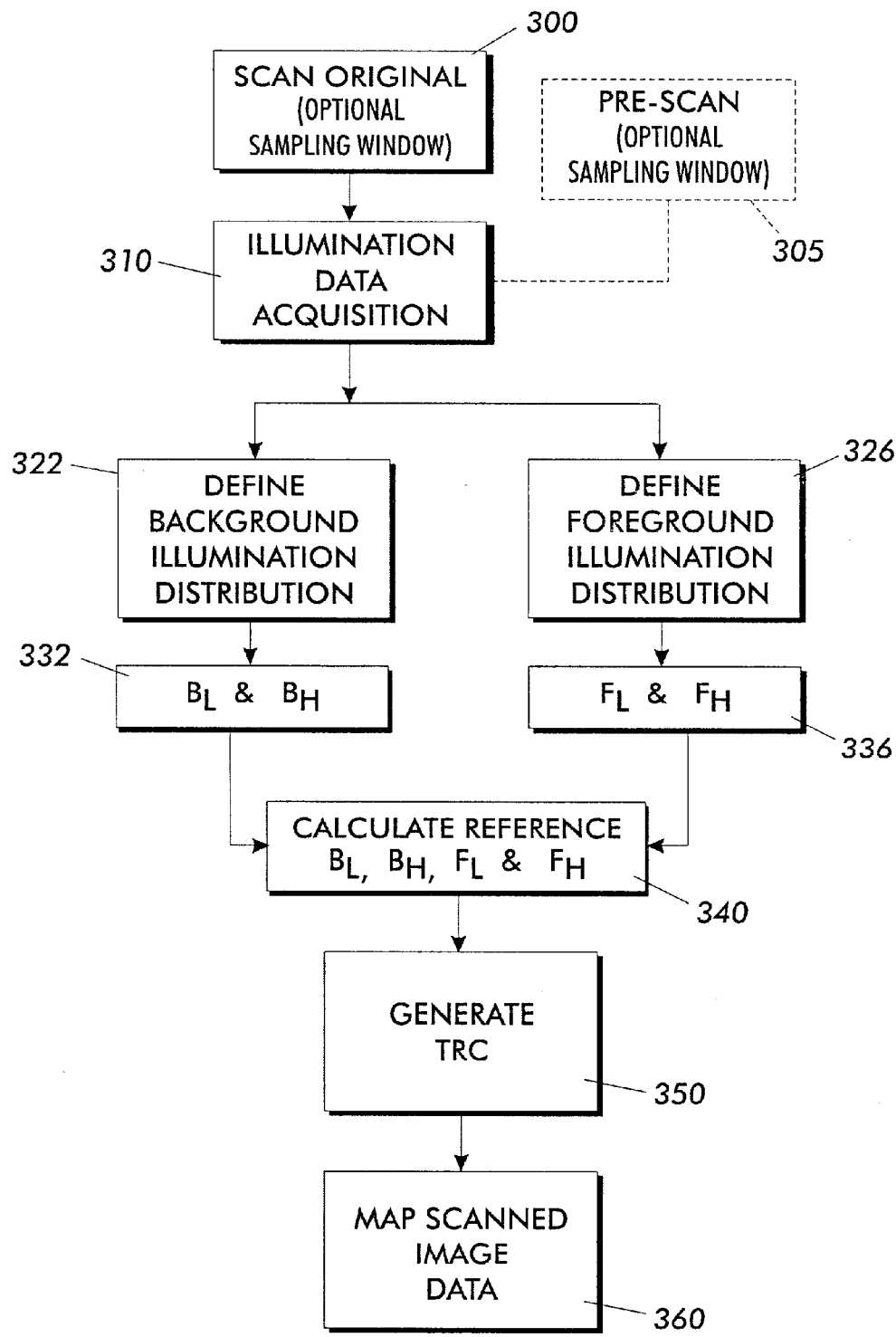
FIG. 3 is a flow chart illustrating one embodiment of the illumination correction method in accordance with the present invention.

With reference to FIG. 3 and continuing reference to FIG. 2, a method of detecting and correcting illumination variation in a scanned image is provided. An original document, such as an open book or other bound material, is scanned 300 in a face down position. In one embodiment, the entire original image is scanned, generating a complete set of scanned image data. Alternatively, a pre-scan 305 is performed to acquire illumination data that will be used in the illumination correction calculations. Preferably, the entire image is scanned, rendering more a complete set of illumination data. However, it is to be appreciated that individual scan lines may be acquired and used for a line-by-line illumination correction.

From the scanned image data, illumination data is acquired 310 at many points across the field of the scanned image. Preferably, the illumination data is acquired 310 through the use of a moving sampling window. The sampling window includes a geometry that is long and thin. More particularly, the sampling window is substantially longer in the direction of the book binding and substantially shorter in the direction orthogonal to the book binding. In one embodiment, the sampling window has dimensions of 1 pixel×200 pixels for a 400 spi scan. Artisans will appreciate that in book scanning applications, the illumination variation is far greater in the direction orthogonal to the book binding. Conversely, illumination variations are relatively constant in the direction parallel to the book binding. Near the upper and lower edges of the book, the sampling window is optionally shortened. Shortening the sampling window ensures that the illumination data is not skewed due to the change in the "integrating cavity," i.e. the region within which light continuously reflects until it is absorbed by a dark portion of the image under scan, absorbed by a photosensor, or escapes through a loss mechanism.

Figure 4:
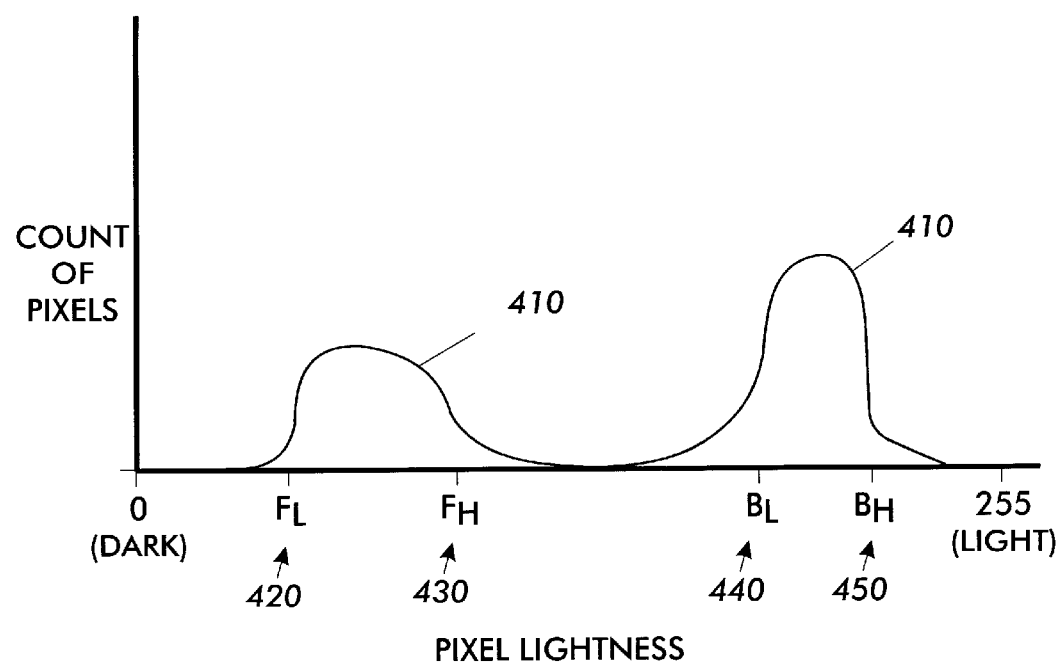
FIG. 4 is a graphical representation of an exemplary illumination histogram in accordance with the present invention.

The key measures of illumination data relate to the light level of the light portions of the image, i.e. background portions, and the light level of the dark portions of the image, i.e. foreground portions, within the sampling window. As is shown in FIG. 4, the illumination data collected within each sampling window is mapped into a pixel histogram. Therefore, as the sampling window is rastered across the scanned image, a plurality of pixel histograms are generated. From the illumination data within each sampling window, background and foreground illumination distributions are defined 322, 326. More particularly, each pixel histogram includes a defined foreground illumination distribution 400 and a background illumination distribution 410. Each of these two modes 400, 410 may be characterized by various measures for the purposes of illumination correction. Preferably, each of the modes is characterized by two values, which provide a measure of the central tendency and a measure of dispersion of each mode.

In one embodiment, the foreground illumination mode 400 is characterized 336 by a foreground low threshold value $F_L$ 420 and a foreground high threshold value, $F_H$ 430. Similarly, the background illumination mode is characterized 332 by a background low threshold value $B_L$ 440 and a background high threshold value $B_H$ 450. In other words, $F_L$ and $F_H$ provide the low and high end of the pixel values for the foreground, e.g. text, and $B_L$ and $B_H$ provide the low and high end of the pixel values for the background, e.g. paper. Alternatively, the foreground and background modes 400, 410 are characterized by other measures of central tendency and dispersion, such as a center value and standard deviation or some other measure of center mode value and mode width. It is to be appreciated that spatial information may be used to obtain more refined central tendency and dispersion values. For example, segmentation means and/or morphological filters may be employed to locate sections of pixel groups that possess a high probability of being in one of the foreground or background modes. In one embodiment, spaces between words and/or lines of text may be used in order to obtain more refined measures of the background illumination.

From the plurality of $B_L$, $B_H$, $F_L$, and $F_H$ values, a set of reference values for $B_L$, $B_H$, $F_L$, and $F_H$ are calculated 340. These reference values are used to normalize the illumination variation across the scanned image. In one embodiment, the reference values are computed by emphasizing the $B_L$, $B_H$, $F_L$, and $F_H$ values found in locations on the page which are far from the book binding. In another embodiment, the reference values are predetermined based on information known about the scanned image. Preferably the $B_L$, $B_H$, $F_L$, and $F_H$ reference values define an illumination function that follows a smooth function in order to avoid a noisy appearance due to differing or oscillatory corrections on neighboring lines. More particularly, the variation in $B_L$ and $F_H$ are smooth across the page in order to achieve a smooth appearance in the compensated image. In a preferred embodiment, the reference values of $B_L$, $B_H$, $F_L$, and $F_H$ lead to an illumination function having some or all of the following properties: applicability in one or two dimensions; having a maximum near the center of the flat portion of the page; decreasing toward the binding and page edges; being single modal; being zero- and first-order continuous; and the function may be a polynomial fit to the data.

Figure 5:
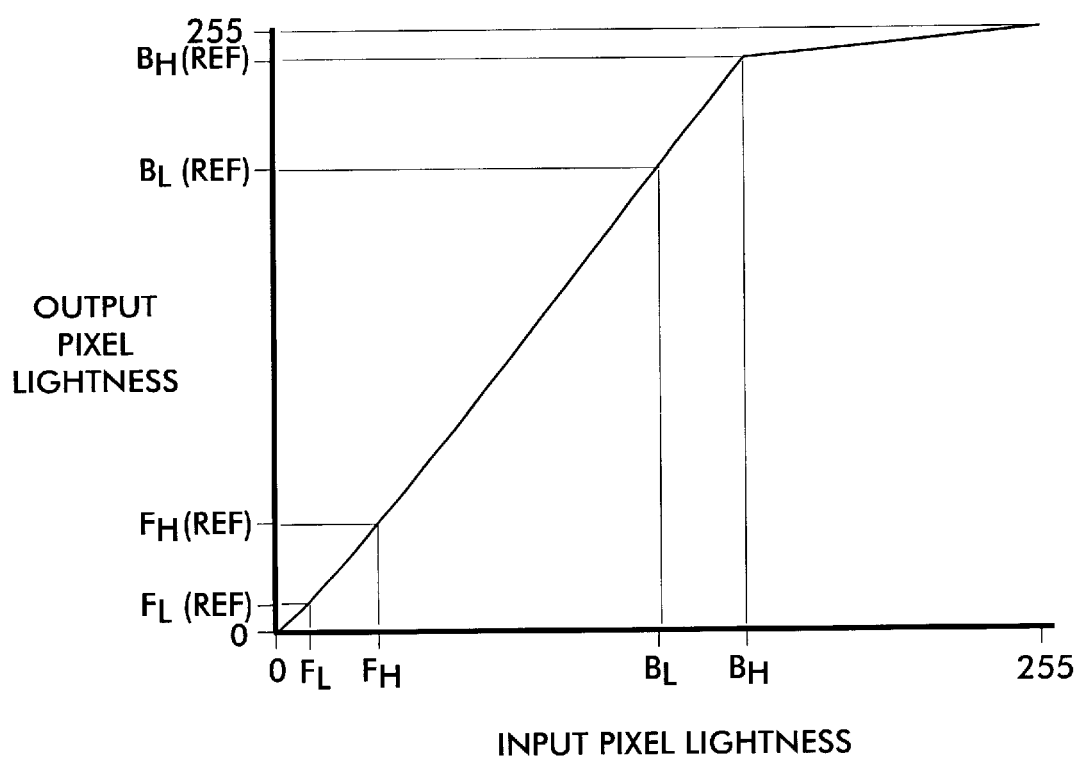
FIG. 5 is a graphical representation of an exemplary tone reproduction curve (TRC) in accordance with the present invention.

Preferably, the illumination compensation is performed using a tone reproduction curve (TRC) 350 that varies with pixel position across the scanned image. The TRC is generated in order to maintain the $B_L$, $B_H$, $F_L$, and $F_H$ reference values across the image field. An exemplary TRC is illustrated in FIG. 5. More particularly, the scanned image data is mapped 360 according to the TRC and the $B_L$, $B_H$, $F_L$, and $F_H$ reference values embodied therein. In an alternate embodiment, the $B_L$, $B_H$, $F_L$, and $F_H$ reference values may be predetermined according to information known about the scanned image. When the reference values are predetermined, less of the scanned image data needs to be held in memory, leading to computational efficiency.

Figure 6:
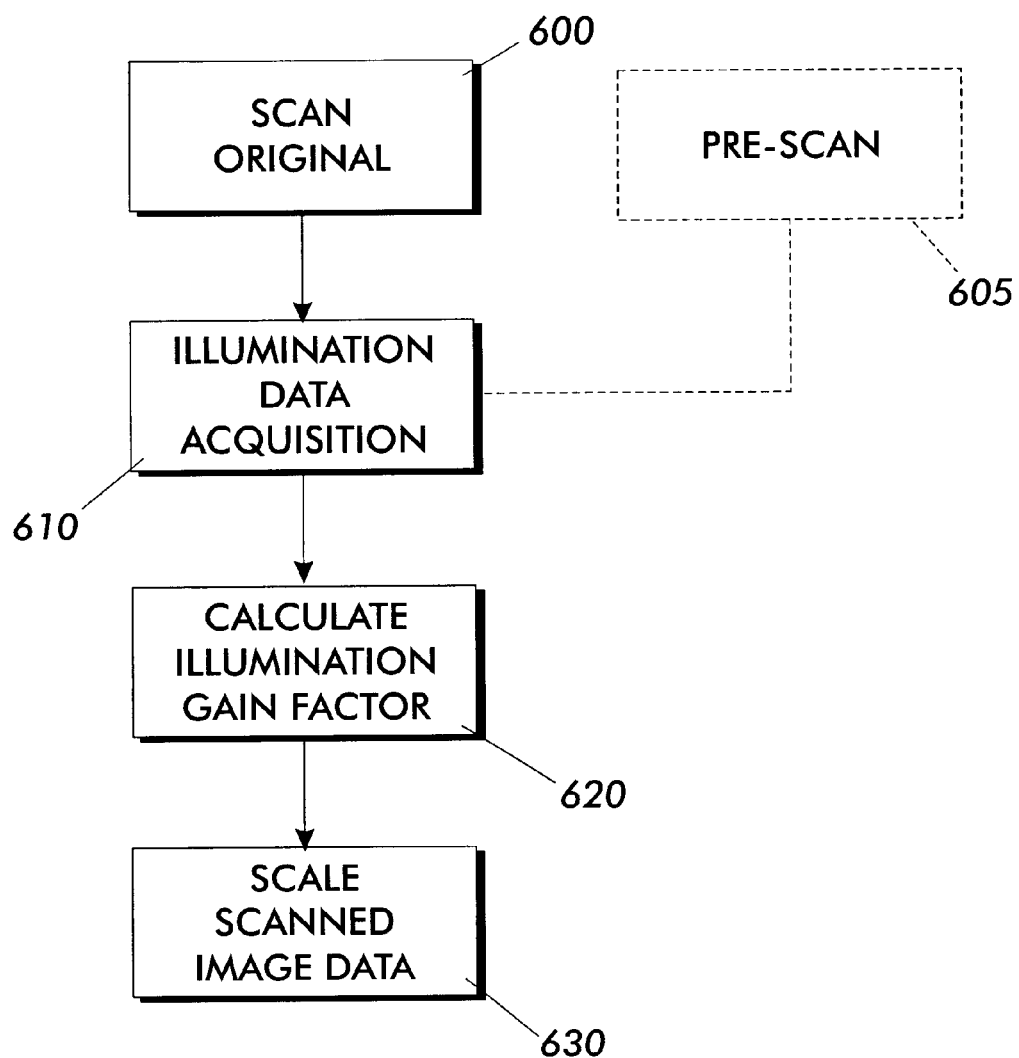
FIG. 6 is a flow chart illustrating a second embodiment of the illumination correction method in accordance with the present invention.

With reference to FIG. 6 and continuing reference to FIG. 3, an alternative embodiment of a method of detecting and correcting illumination variation in a scanned image is provided. As described above, an original document, such as an open book, is scanned in a face down position. In one embodiment, the entire original is scanned 600, generating a complete set of scanned image data. Alternatively, a pre-scan 605 is performed to acquire illumination data to be used in the subsequent illumination correction calculations. Preferably, the entire image is scanned, rendering a more complete set of illumination data for processing. However, as in the earlier embodiment, it is to be appreciated that individual scan lines may be acquired and used for a line-by-line illumination correction.

From the scanned image data, illumination data is extracted 610 at many points across the field of the scanned image. Preferably, the illumination data is extracted 610 through the use of a moving sampling window. As described above, the sampling window is substantially longer in a direction parallel to the book binding and substantially shorter in a direction perpendicular to the book binding, such as 1 pixel by 200 pixels for a 400 spi scan. This sampling window geometry includes a substantially larger number of pixels along the direction parallel to the book binding, in which there is minimal illumination variation, and a substantially smaller number of pixels along the direction perpendicular to the book binding, in which there is significant illumination variation. Optionally, the sampling window is shortened near the upper and lower edges of the book.

Figure 7:
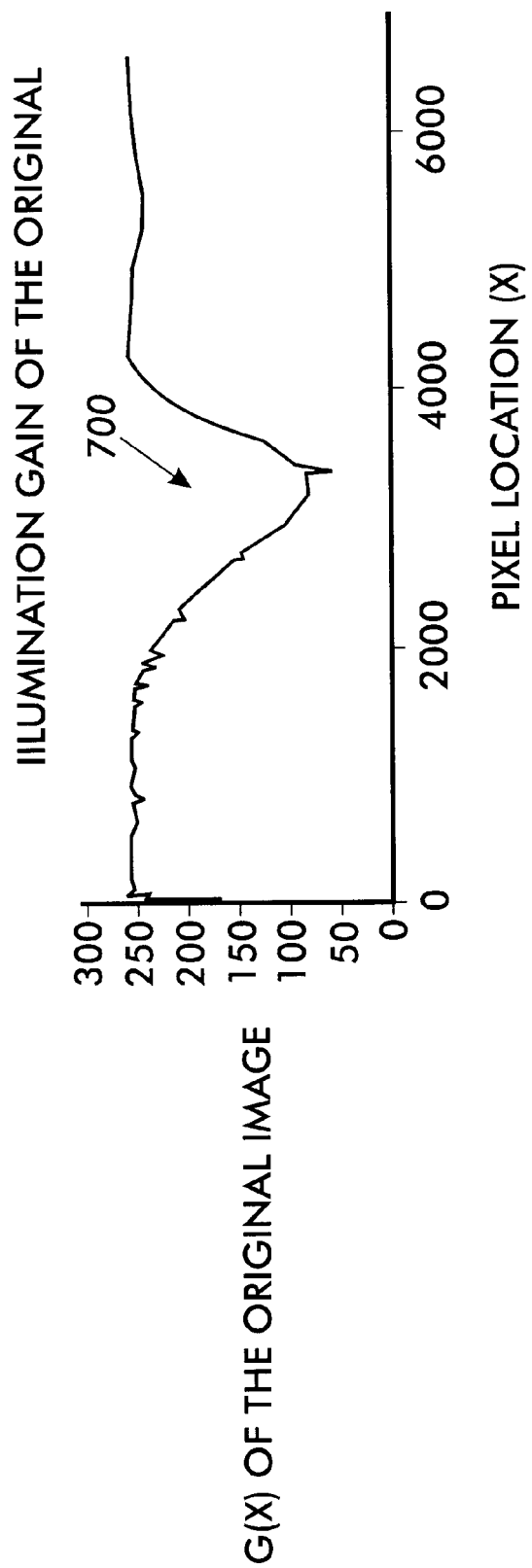
FIG. 7 is a graphical representation of an exemplary illumination gain factor computed in accordance with the present invention.

A spatially dependent illumination gain factor g(x) is calculated 620 from the illumination data extracted through the sampling window. More particularly, the illumination variation is estimated by examining a pixel histogram within each sampling window. For a given sampling window position, the spatially dependent illumination gain factor g(x) is calculated from the average maximum illumination. In one embodiment, the average maximum illumination is the average of the rank-ordered upper 10% of pixel values within the window. Alternatively, the rank-ordered upper 20% of pixel illumination values are averaged. Calculating the average maximum illumination for all sampling window positions yields g(x) for the original scanned image. Such an illumination gain factor for an exemplary scanned original is illustrated in FIG. 7. As shown in FIG. 7, a plot of the illumination gain factor g(x) shows great illumination variation in the region 700 adjacent the book binding.

Figure 8:
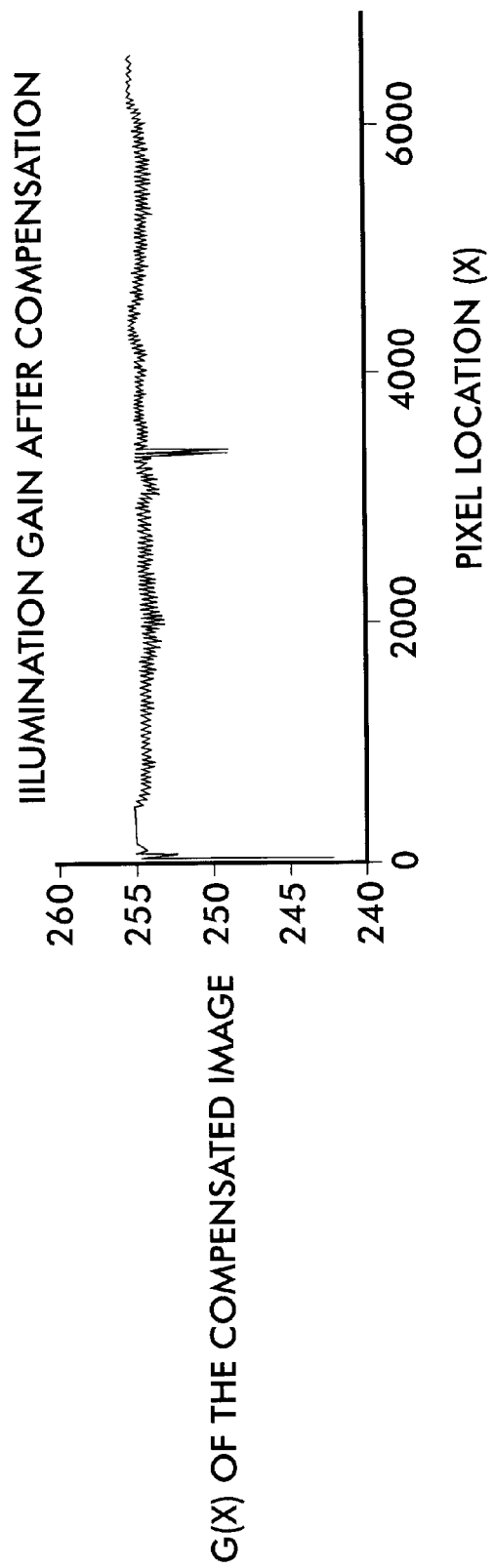
FIG. 8 is a graphical representation of an exemplary illumination gain factor computed for a corrected image in accordance with the present invention.

The calculated illumination gain factor g(x) is used in the illumination compensation 630 of the scanned image data. In one embodiment, the scanned image data i(x, y) is compensated by way of a scaling according to the relationship:

$$i'(x, y)=i(x, y)/g(x),$$

where i'(x, y) is the compensated image data. As is illustrated in FIG. 8, the illumination compensation removes the variable illumination gain in the region adjacent the book binding. In another embodiment, a predetermined offset value b(x) is applied in the illumination compensation step 630 according to the relationship:

$$i'(x, y)=i(x, y)/g(x)-b(x).$$

The predetermined offset value is useful in compensating for problems unrelated to the book binding, such as suppression of show-through print on thin paper.

In one embodiment, the present illumination compensation is implemented using a digital tone reproduction curve (TRC), as is illustrated in FIG. 5. In another embodiment, the illumination compensation is implemented by applying the illumination gain factor g(x) to the illuminator on a second scan of the original. In this embodiment, the compensation is applied through physical control, while residual errors at the page edges are compensated digitally using the TRC implementation. It is to be appreciated that the illumination information acquired via the present method may be used to determine defocus distance, given a suitable calibration.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A method of correcting illumination variation in a scanned image of a non-planar original object, said method comprising:

scanning at least a portion of the non-planar original object to produce scanned image data;

acquiring illumination variation data from the scanned image data;

deriving a plurality of illumination compensation values from the acquired illumination variation data;

altering the scanned image data in accordance with the illumination compensation values, wherein the step of deriving a plurality of illumination compensation values includes: defining a background illumination distribution and a foreground illumination distribution; determining a background low threshold value $B_L$ and a background high threshold value $B_H$ from each background illumination distribution; determining a foreground low threshold value $F_L$ and a foreground high threshold value $F_H$ from each foreground illumination distribution; and calculating reference values for $B_L$, $B_H$, $F_L$, and $F_H$, from the plurality of determined $B_L$, $B_H$, $F_L$, and $F_H$ values.

2. The method as set forth in claim 1, wherein the step of acquiring illumination variation data includes:

measuring illumination values at a plurality of pixel locations within a sampling window; and rastering the sampling window across the scanned image data.

3. The method as set forth in claim 2, wherein the step of deriving a plurality of illumination compensation values includes:

for each set of illumination values within a sampling window, defining a background illumination distribution and a foreground illumination distribution.

4. The method as set forth in claim 3, wherein the step of deriving a plurality of illumination compensation values further includes:

from each background illumination distribution, determining at least two threshold measures characterizing a central location and a dispersion of each background illumination distribution; and from each foreground illumination distribution, determining at least two threshold measures characterizing a central location and a dispersion of each foreground illumination distribution.

5. The method as set forth in claim 4, wherein the reference values for $B_L$, $B_H$, $F_L$, and $F_H$ are calculated from sampling window positions far from non-planar regions of the scanned image, such that variations in $B_L$ and $F_H$ are smooth across the scanned image.

6. The method as set forth in claim 4, wherein the step of altering the scanned image data includes:

generating a tone reproduction curve (TRC) corresponding to the calculated reference values for $B_L$, $B_H$, $F_L$, and $F_H$; and mapping inputted scanned image data according to the generated TRC in order to maintain positions of $B_L$, $B_H$, $F_L$, and $F_H$ across the scanned image.

7. The method as set forth in claim 1, wherein the reference values for $B_L$, $B_H$, $F_L$, and $F_H$ are calculated far from non-planar regions of the scanned image, such that variations in $B_L$ and $F_H$ are smooth across the scanned image.

8. The method as set forth in claim 1, wherein the step of altering the scanned image data includes:

generating a tone reproduction curve (TRC) corresponding to the calculated reference values for $B_L$, $B_H$, $F_L$, and $F_H$; and mapping inputted scanned image data according to the generated TRC in order to maintain positions of $B_L$, $B_H$, $F_L$, and $F_H$ across the scanned image.

9. A digital imaging method for imaging an open book having a book binding, said method comprising:

scanning the open book to produce scanned image data, said image data containing illumination variations adjacent the book binding;

extracting illumination data from the scanned image;

normalizing the illumination variations across the scanned image; and outputting the normalized image data on a physical media, wherein the extracting illumination data step includes obtaining light levels of (i) background portions and (ii) foreground portions of the image;

wherein the normalizing step includes defining a background illumination distribution and a foreground illumination distribution, from the obtained light levels; determining a background low threshold value $B_L$ and a background high threshold value $B_H$ from each background illumination distribution; and determining a foreground low threshold value $F_L$ and a foreground high threshold value $F_H$ from each foreground illumination distribution; calculating reference values for $B_L$, $B_H$, $F_L$, and $F_H$ based on a plurality of $B_L$, $B_H$, $F_L$, and $F_H$ values determined from regions not adjacent the book binding; generating a tone reproduction curve (TRC) corresponding to the calculated reference values of $B_L$, $B_H$, $F_L$, and $F_H$; and compensating the scanned image data in accordance with the generated TRC in order to maintain positions of $B_L$, $B_H$, $F_L$, and $F_H$ values across the scanned image that are consistent with the corresponding reference values.

10. The method as set forth in claim 9, wherein the extracting illumination data step includes:

defining a sampling window which is substantially longer in a direction parallel to the book binding and substantially shorter in a direction orthogonal to the book binding; and at each sampling position of the sampling window along the direction orthogonal to the book binding, obtaining light levels of (i) background portions and (ii) foreground portions of the image within the sampling window.

11. The method as set forth in claim 10, wherein the normalizing step includes:

from the obtained light levels, defining a background illumination distribution and a foreground illumination distribution;

from each background illumination distribution, determining a background low threshold value $B_L$ and background high threshold value $B_H$; and from each foreground illumination distribution, determining a foreground low threshold value $F_L$ and a foreground high threshold value $F_H$.

12. A digital imaging method for imaging an open book having a book binding, said method comprising:

scanning the open book to produce scanned image data, said image data containing illumination variations adjacent the book binding;

extracting illumination data from the scanned image;

normalizing the illumination variations across the scanned image; and outputting the normalized image data on a physical media;

wherein the extracting illumination data step includes obtaining light levels of (i) background portions and (ii) foreground portions of the image;

wherein the normalizing step includes calculating an illumination scaling factor g(x) from the average of the upper 10 percent of background light levels; and scaling the scanned image data i(x, y) according to the relationship: i'(x, y)=i(x, y)/g(x).

13. The method as set forth in claim 12, wherein the extracting illumination data step includes:

defining a sampling window which is substantially longer in a direction parallel to the book binding and substantially shorter in a direction orthogonal to the book binding; and at each sampling position of the sampling window along the direction orthogonal to the book binding, obtaining light levels of (i) background portions and (ii) foreground portions of the image within the sampling window.

14. The method as set forth in claim 13, wherein the normalizing step includes:

for each sampling position of the sampling window, calculating an illumination scaling factor g(x) from the average of the upper 10 percent of background light levels within the sampling window; and scaling the scanned image data i(x, y) according to the relationship: i'(x, y)=i(x, y)/g(x).

15. A xerographic apparatus for reproducing an image representation of a scanned open book, said apparatus comprising:

a planar imaging platen;

means for scanning the open book placed on the platen to produce scanned image data, said scanned image data containing illumination variation adjacent a binding of the book;

means for extracting illumination data from the scanned image data;

a processor for calculating a plurality of illumination compensation parameters from the extracted illumination data;

an image processor for compensating the scanned image data for illumination variations;

an illuminator for transferring an image charge pattern onto a photoreceptor;

at least one developing station for developing the charge pattern; and at least one fuser station for fixing a developed image onto a physical media;

wherein the processor for calculating a plurality of illumination compensation parameters includes means for defining a background illumination distribution and a foreground illumination distribution; and means for determining high and low threshold values for the background and foreground illumination distributions;

wherein the image processor includes means for calculating a illumination compensation factor g(x) and means for scaling the scanned image data i(x, y) according to the relationship i'(x, y)=i(x, y)/g(x).

16. The xerographic apparatus as set forth in claim 15, wherein means for extracting illumination data from the scanned image data includes:

a sampling window which includes a substantially larger number of pixels along a first direction and a substantially smaller number of pixels along a second direction, said second direction being orthogonal to the first direction.

17. The xerographic apparatus as set forth in claim 16, wherein the processor for calculating a plurality of illumination compensation parameters includes:

means for defining a background illumination distribution and a foreground illumination distribution for each sampling window position; and means for determining high and low threshold values for the background and foreground illumination distributions.

18. The xerographic apparatus as set forth in claim 17, wherein the illumination compensation factor g(x) includes an average of the upper 10 percent of background illumination values within the sampling window at each sampling position.

19. The xerographic apparatus as set forth in claim 15, wherein the illumination compensation factor g(x) includes an average of the upper 10 percent of background illumination values.

20. A method of correcting illumination variation in a scanned image of a non-planar original object, said method comprising:

scanning at least a portion of the non-planar original object to produce scanned image data;

acquiring illumination variation data from the scanned image data;

deriving a plurality of illumination compensation values from the acquired illumination variation data;

altering the scanned image data in accordance with the illumination compensation values;

wherein the step of acquiring illumination variation data includes measuring illumination values at a plurality of pixel locations;

wherein the step of deriving a plurality of illumination compensation values includes calculating a spatially-dependent illumination gain factor g(x) from the measured illumination values; and wherein the step of altering the scanned image data i(x, y) includes scaling and offsetting the scanned image data according to the relationship i'(x, y)=i(x,y)/g(x)−b(x) and b(x) is a predetermined illumination offset factor.

21. The method as set forth in claim 20, wherein calculating the spatially-dependent illumination gain factor g(x) includes averaging no more than a rank-ordered upper 20 percent of the pixel illumination values.

22. The method as set forth in claim 21, wherein the step of altering the scanned image data i(x, y) includes scaling the scanned image data according to the relationship i'(x, y)=i(x, y)/g(x).

23. The method as set forth in claim 20, wherein the step of acquiring illumination variation data includes:

measuring illumination values at a plurality of pixel locations within a sampling window; and rastering the sampling window across the scanned image data.

24. The method as set forth in claim 23, wherein the sampling window includes a substantially larger number of pixels in a first direction and a substantially smaller number of pixels in a second direction, said second direction being orthogonal to the first direction.

25. The method as set forth in claim 24, wherein calculating the spatially-dependent illumination gain factor g(x) includes:

for each sampling position of the sampling window, averaging no more than a rank-ordered upper 20 percent of the pixel illumination values within the sampling window.

26. The method as set forth in claim 25, wherein the step of altering the scanned image data i(x, y) includes:

scaling the scanned image data according to the relationship i'(x, y)=i(x, y)/g(x).

27. The method as set forth in claim 25, wherein the step of altering the scanned image data i(x, y) includes:

scaling and offsetting the scanned image data according to the relationship i'(x, y)=i(x, y)/g(x)−b(x);

wherein b(x) is a predetermined illumination offset factor.

28. A xerographic apparatus for reproducing an image representation of a scanned open book, said apparatus comprising:

a planar imaging platen;

means for scanning the open book placed on the platen to produce scanned image data, said scanned image data containing illumination variation adjacent a binding of the book;

means for extracting illumination data from the scanned image data;

a processor for calculating a plurality of illumination compensation parameters from the extracted illumination data;

an image processor for compensating the scanned image data for illumination variations;

an illuminator for transferring an image charge pattern onto a photoreceptor;

at least one developing station for developing the charge pattern; and at least one fuser station for fixing a developed image onto a physical media;

wherein the processor for calculating a plurality of illumination compensation parameters includes means for defining a background illumination distribution and a foreground illumination distribution; and means for determining high and low threshold values for the background and foreground illumination distributions; and wherein the image processor includes means for generating a tone reproduction curve (TRC) corresponding to the determined high and low threshold values for the background and foreground illumination distributions not adjacent the book binding, and means for mapping scanned image data in accordance with the generated TRC.

29. The xerographic apparatus as set forth in claim 28, wherein means for extracting illumination data from the scanned image data includes:

a sampling window which includes a substantially larger number of pixels along a first direction and a substantially smaller number of pixels along a second direction, said second direction being orthogonal to the first direction.

30. The xerographic apparatus as set forth in claim 29, wherein the processor for calculating a plurality of illumination compensation parameters includes:

means for defining a background illumination distribution and a foreground illumination distribution for each sampling window position; and means for determining high and low threshold values for the background and foreground illumination distributions.

* * * * *